(No Model.) 8 Sheets—Sheet 1.
A. W. MESTON.
ELECTRIC MOTOR.
No. 526,083. Patented Sept. 18, 1894.
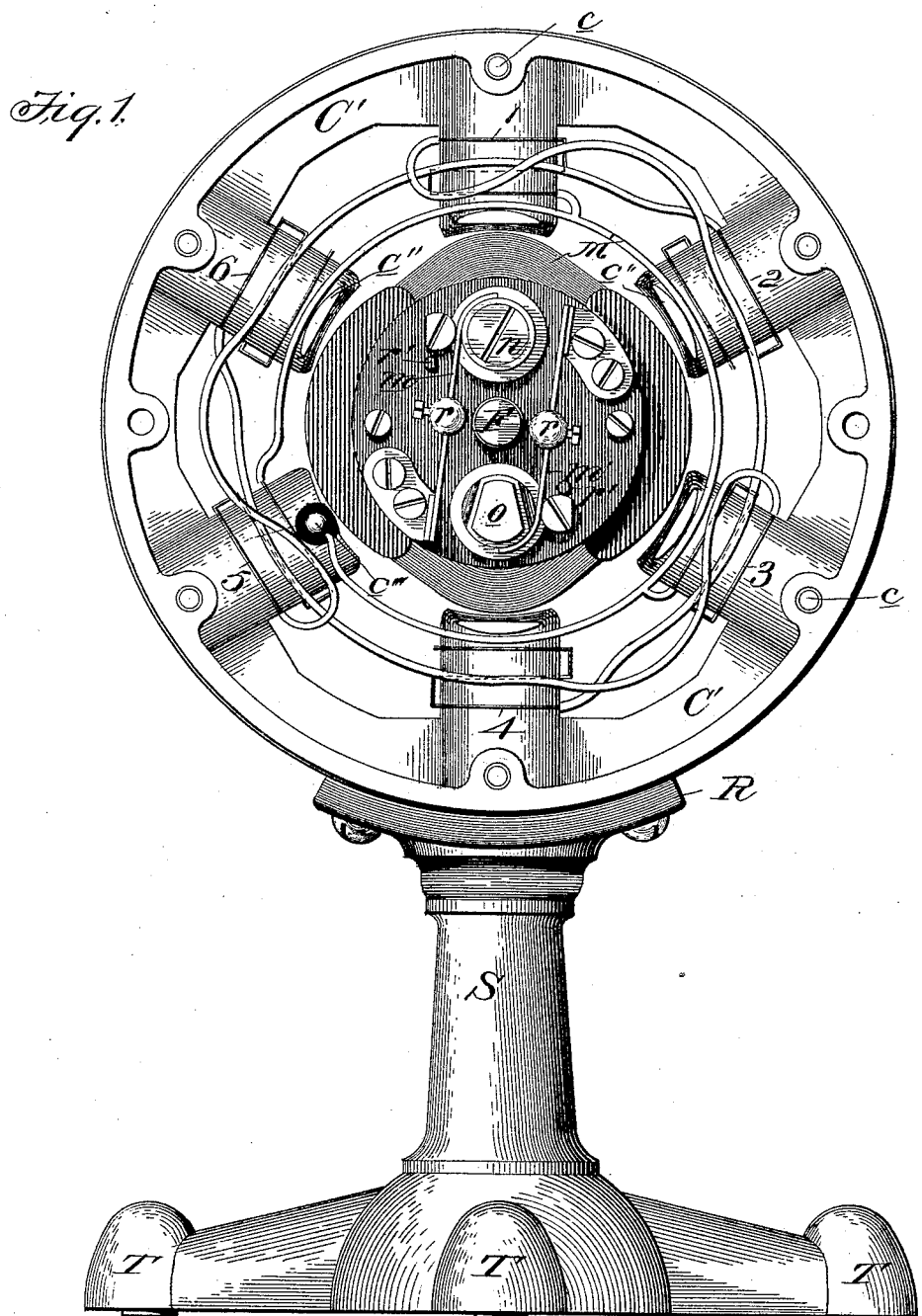

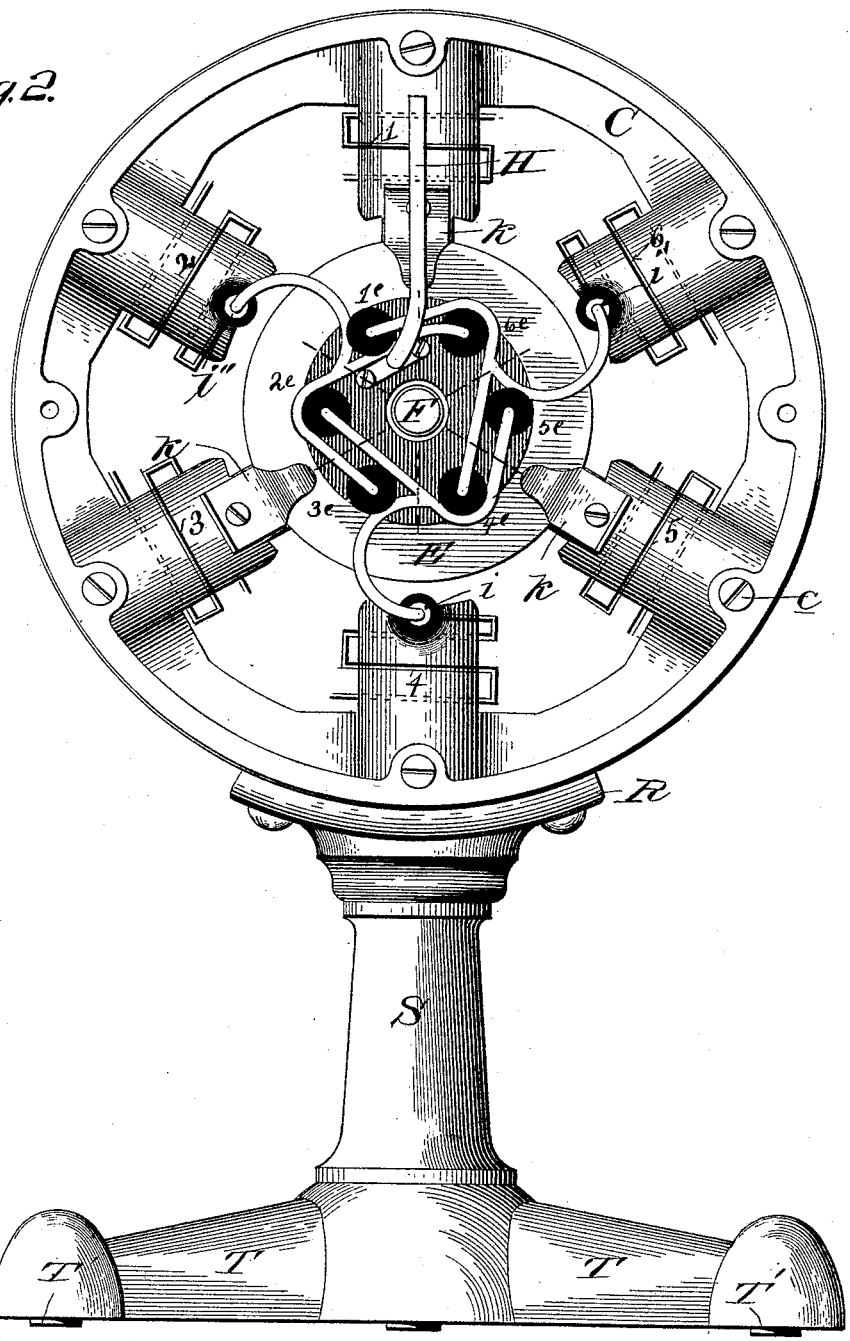

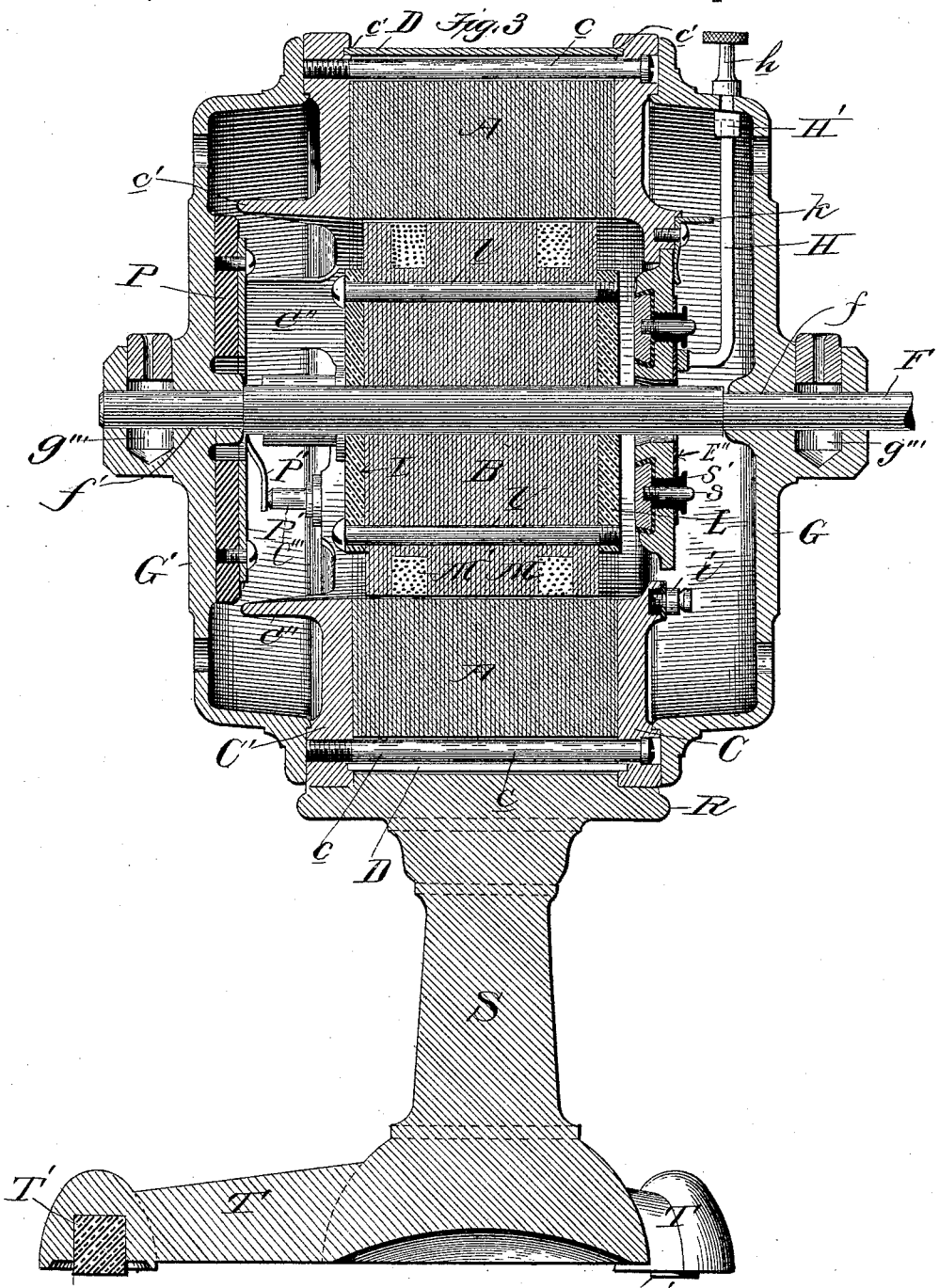

(No Model.)  8 Sheets—Sheet 4.
A. W. MESTON.
ELECTRIC MOTOR.
No. 526,083. Patented Sept. 18, 1894.
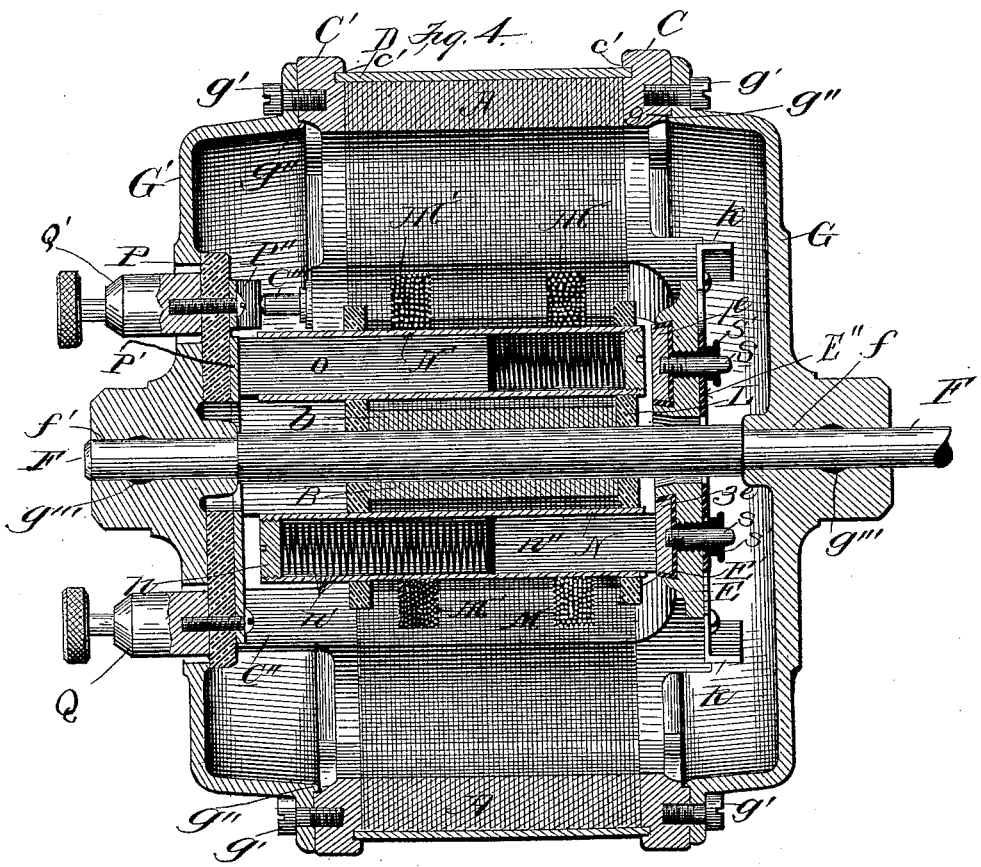
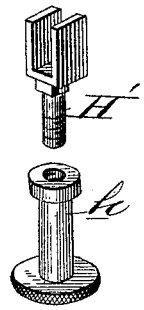
Witnesses  
F. A. Cornwall  
A. Ramel
Inventor  
Alex. W. Meston.  
By Paul Bakewell  
Atty.

(No Model.) 8 Sheets—Sheet 5.
A. W. MESTON.
ELECTRIC MOTOR.
No. 526,083. Patented Sept. 18, 1894.
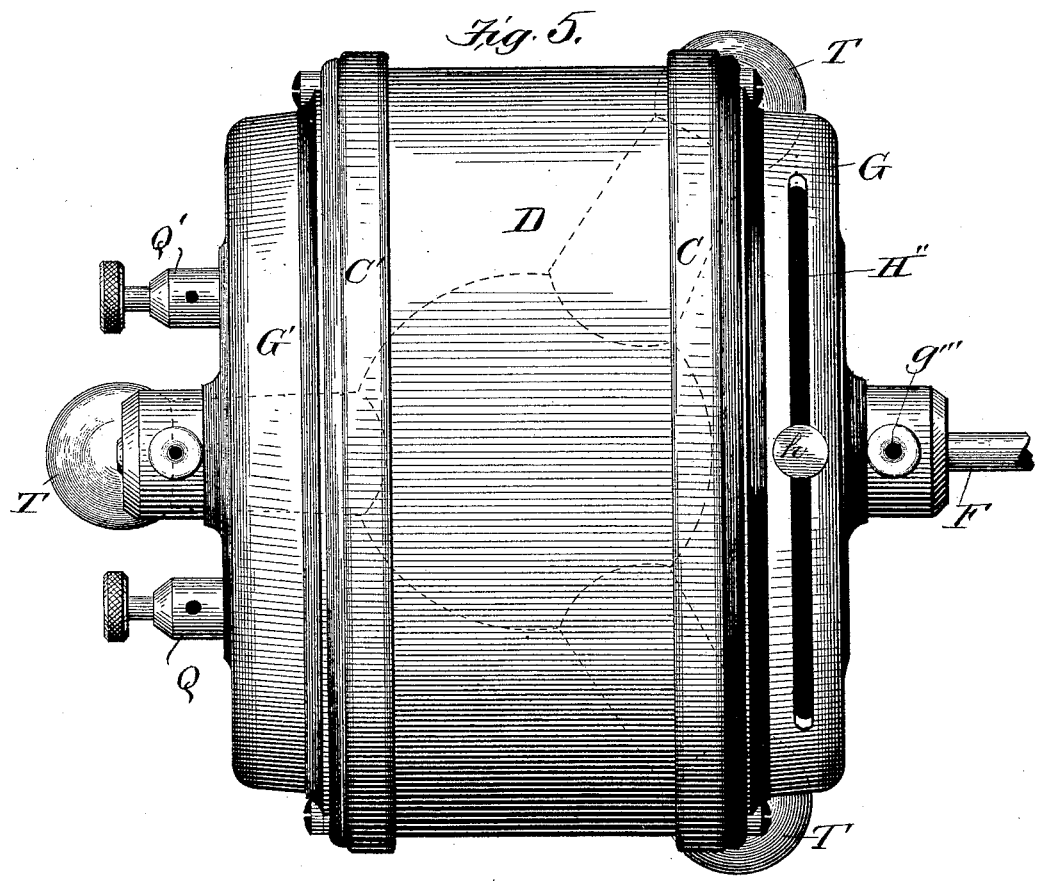
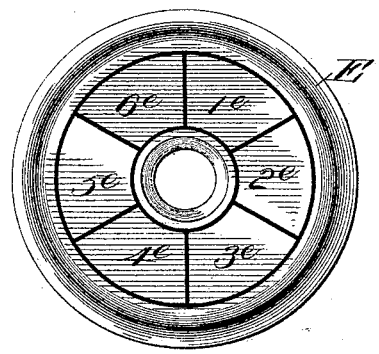
Witnesses:
J. R. Cornwall
A. Ramel
Inventor,
Alex. W. Meston,
by
Paul Bakewell,
att'y.

(No Model.) 8 Sheets—Sheet 6.
A. W. MESTON.
ELECTRIC MOTOR.
No. 526,083. Patented Sept. 18, 1894.
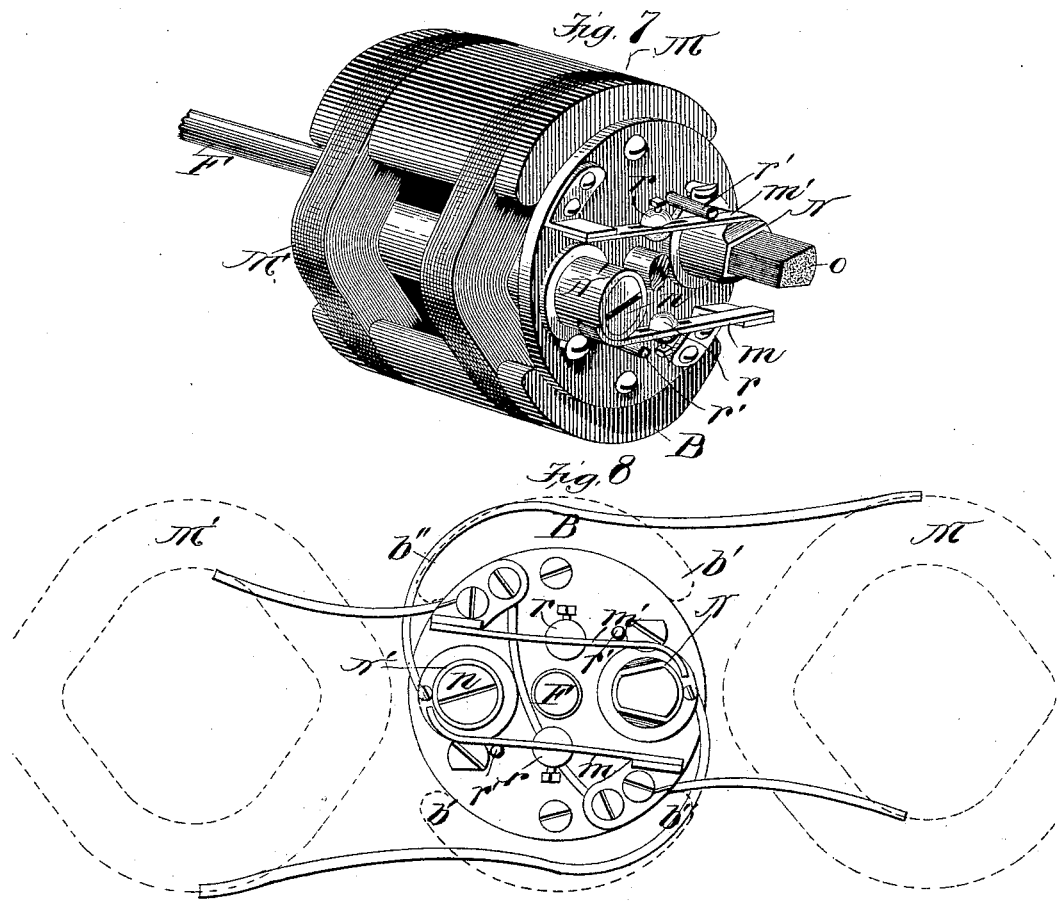
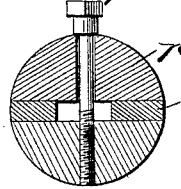
Witnesses
F. R. Cornwall
A. Ramel.
Inventor,
Alex. W. Meston
By Paul Bakewell
Atty (No Model.)  8 Sheets—Sheet 7.
A. W. MESTON.
ELECTRIC MOTOR.
No. 526,083.  Patented Sept. 18, 1894.
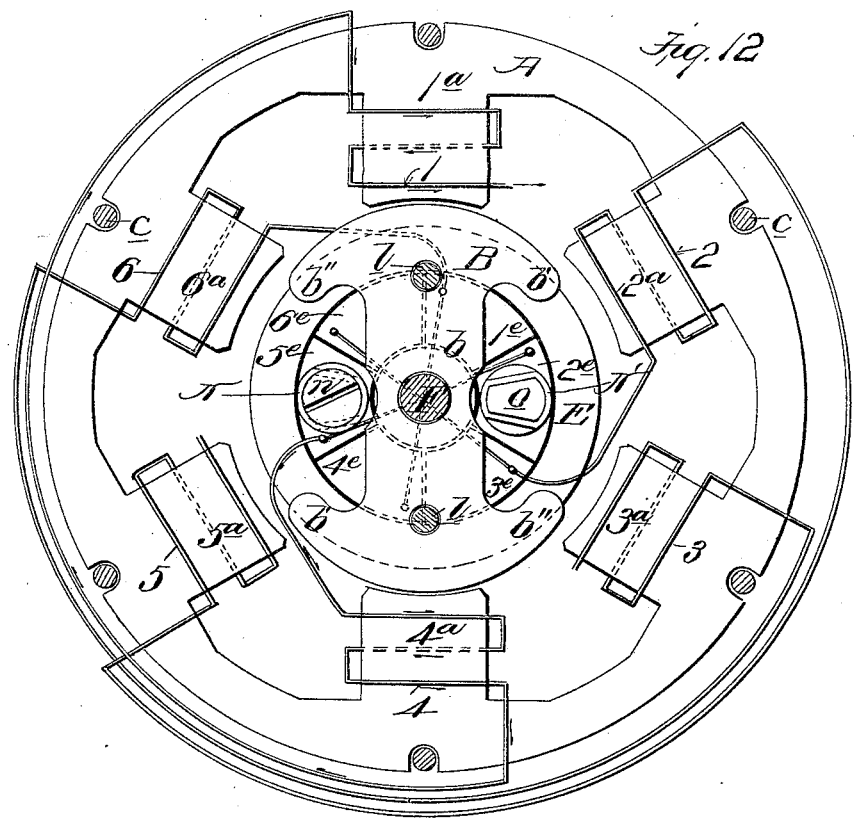
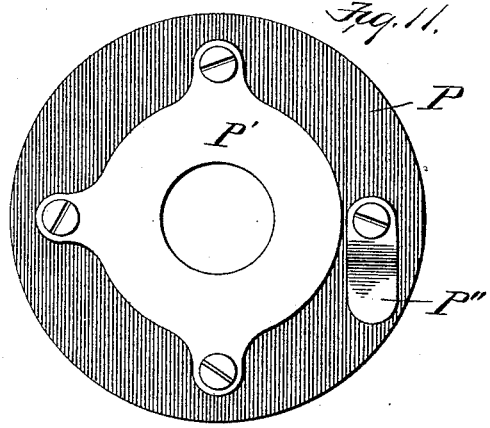
Witnesses
F. P. Cornwall
A. Ramel
Inventor
Alex. W. Meston
By Paul Bakewell
Atty.

(No Model.) 8 Sheets—Sheet 8.

A. W. MESTON.
ELECTRIC MOTOR.

No. 526,083. Patented Sept. 18, 1894.

Witnesses:
F. F. Cornwall
A. Ramel

Inventor
Alex. W. Meston
By Paul Bakewell
Atty.

UNITED STATES PATENT OFFICE.

ALEXANDER W. MESTON, OF ST. LOUIS, MISSOURI, ASSIGNOR TO THE EMERSON ELECTRIC MANUFACTURING COMPANY, OF SAME PLACE.

ELECTRIC MOTOR.

SPECIFICATION forming part of Letters Patent No. 526,083, dated September 18, 1894.

Application filed August 1, 1892. Serial No. 441,867. (No model.)

*To all whom it may concern:*

Be it known that I, ALEXANDER W. MESTON, a citizen of the United States, residing in the city of St. Louis, State of Missouri, have invented certain new and useful Improvements in Electric Motors, of which the following is a full, clear, and exact description, reference being had to the accompanying drawings forming a part thereof.

My invention relates to electric motors in general, more particularly, to that type of electric motors adapted to be operated by alternating currents.

It has for its object, primarily, improvements in a motor of this character adapting it, first, to be automatically self-regulating under different loads; second, to be sensitively and positively self-starting from all possible positions of the armature, even under a load; third, to be reversed to run equally well in either direction, and, at the same time, be susceptible of being set to run at different speeds and, fourth, to run for a comparatively long time without requiring attention. In general, improvements adapting the motor to be inexpensively and conveniently constructed, simple, and easily operated.

It consists in the novel features of improvement in the details of construction and consequent method of operation whereby the objects enumerated above, among other desirable results, have been effected, as hereinafter described.

Figure 13:
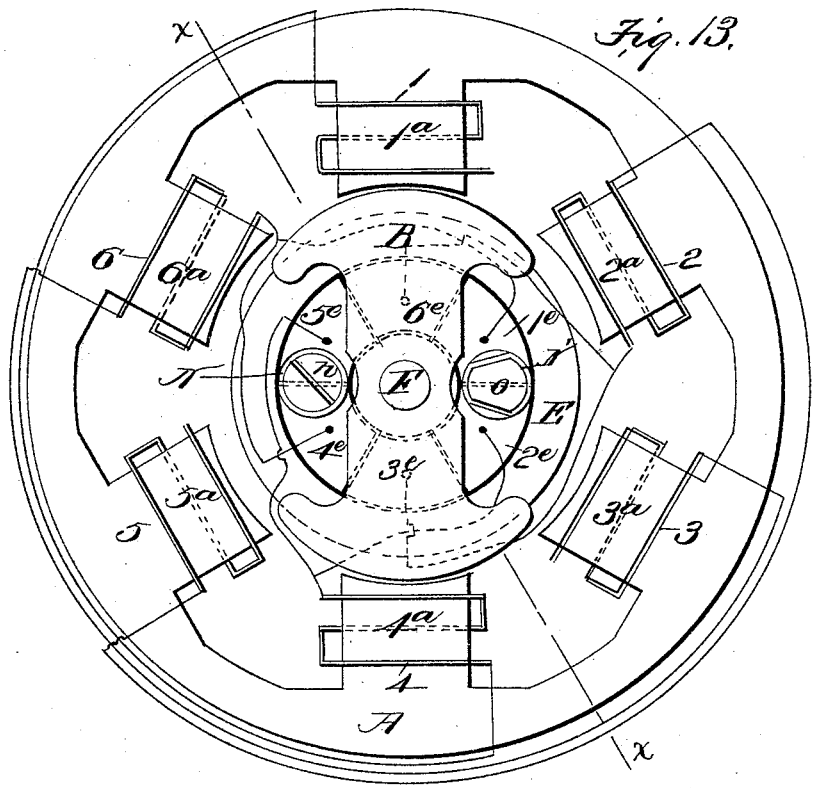
Figure 14:
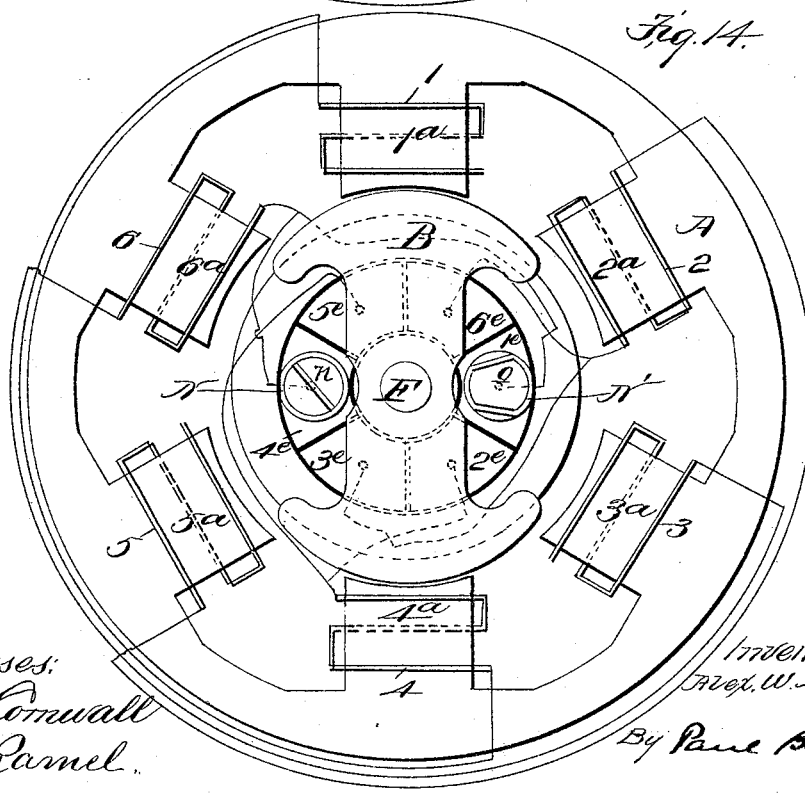

In the accompanying drawings, in which like symbols of reference denote like parts in the several views, Figure 1 is an end elevational view of the motor, with the near inclosing plate removed, showing the armature horizontally disposed, showing the method of cross-connecting the field-magnet windings. Fig. 2 is a view, similar to Fig. 1, of the other end of the motor, showing, more particularly, the adjustable commutator, and method of cross-connecting the same. Fig. 3 is a central vertical section of the motor, taken parallel to the axis of rotation of the armature, which, in this instance, is vertically disposed, the winding on the field-magnet not being shown. Fig. 4 is a horizontal section of the motor, taken through the axis of rotation of the armature, which is vertically placed, as in Fig. 3. Fig. 5 is a plan-view of the machine assembled. Fig. 6 is a plan-view of the commutator disk. Fig. 7 is a perspective view of the armature, illustrative, more particularly, of the automatic regulation devices. Fig. 8 is a schematic view of the operation of the self-regulating devices. Fig. 9 is a longitudinal section of the brush holder. Fig. 10 is a sectional view of the weights by which the self-regulating device is operated. Fig. 11 is a plan-view of the annular contact-plate, to which one of the exterior terminals of the motor is secured and from which the current is delivered, through the brushes, to the commutator plate. Figs. 12, 13, and 14 are similar diagrammatic views, illustrative of the operative features of the adjustable commutator plate, showing between the different views, relatively changed positions of the revoluble commutator. Fig. 15 is a detail perspective view of the means of moving the commutator handle and clamping the same.

As illustrated in Figs. 3 and 4, the field-magnet A of my motor is composed of a number of sheets of soft iron of the form illustrated in Figs. 12, 13, and 14, rigidly secured together by the spider plates C and C′ and clamping through bolts c, the spider plates having the same general form in outline as the laminations of the field-magnet, being only a little larger diametrically, for reasons which will hereinafter appear, as shown in Figs. 1 and 2. The plate C is counter-sunk to accomodate the heads of the through-bolts c, so that the annular portion of the outside faces of the same are flush, to receive the inclosing plates, hereinafter described.

The laminations of the field-magnet A are formed with an annular portion provided with a plurality of inwardly-extending, radially-disposed polar extensions, $1^a$, $2^a$, $3^a$, &c., the inner operative faces of which are formed concentric with the axis of rotation of the armature B.

The radially-projecting edges of the spider plates C and C′, are formed with similar annular grooves c′ adapted to receive the side edges of the split band D (see Figs. 3 and 4), which is carefully milled to width, and, when the machine is assembled, (the through-bolts c′ drawing together the more or less compressible laminations of which the field-magnet is composed,) acts as a spacer to retain the spider plates C and C' a definite distance apart, accurately determining the width or thickness of the field-magnet as a whole. The outside surface of that portion of the spider plates C and C' which corresponds to the polar extensions of the field-magnet is preferably rounded off, as shown in Figs. 1 and 2, to receive the field-magnet coils, and one of them, as C', is formed, as shown in Figs. 3, 4, and 1, with lateral extensions or knees C'' adapted to retain the field-magnet coils in place when the motor is assembled. One of these extensions is replaced with a stud or pin C''', electrically insulated from the spider plate, which acts as a common terminal for the inner terminals of the several field-magnet coils not otherwise connected, as hereinafter explained. To the alternate inner extremities of the polar extension portions of the other spider plate, C, are secured, respectively, the insulated pins $i$, $i'$, and $i''$, and the clip springs $k$, between which, and the turned off shoulders in the extreme ends of the inwardly-extending portions of the spider-plate, is revolubly secured the outer edge of the disk commutator-plate E, hereinafter described, as illustrated in Fig. 3. The rear end of the clip springs $k$, are turned up at right-angles, forming lateral extensions to the plate C, similar to the extension C'' on the plate C', and for the same purpose.

The armature B, which is laminated similar to the field-magnet, is rigidly mounted on the shaft F, which has journal-bearings $f$ and $f'$ in the central hub portions of the inclosing plates, G and G'. The form of the laminations of which the armature B is composed is shown in Figs. 12, 13, and 14, and consists in a body-portion $b$, equally disposed diametrically on either side of its axial shaft F, and the oppositely-extending projections $b'$ and $b''$. The circumferential surface of the armature is formed eccentric to the axis of rotation, being gradually radially reduced to a similar degree from the center to either edge. The laminations of the armature B are secured together by the traverse bolts $l$, in the length of which are included the two disks L of insulating material on either end of the armature B. As shown in Figs. 3 and 4, and, in detail, in Fig. 7, there are formed in the outer operative surface of the material of the armature B one, two, or more, circumferential grooves, adapted to accommodate several coils M and M' of wire, the method of connecting and uses of which will hereinafter be described.

The brush holders N and N' consist in a metal tube (see Fig. 9) closed at one end, preferably by removable screw-plug $n$, and containing a delicate compression-spring $n'$. The open end is crimped to conform to the cross-section of the stick $o$ of carbon. The cross-section of the carbon stick $o$ is practically a truncated section, being formed by flattening opposite sides of the sticks of round carbon corresponding to chords of the circumference at an angle relative to each other corresponding to the radii of the circle in which the carbons, as a whole, revolve, when mounted in the motor. In this manner, in the operation of the motor, when the brush $o$, in contact with the commutator E, is made to revolve, the brush $o$ makes contact and breaks circuit at once, as a whole, with any of the separate segments $1^e$, $2^e$, &c.

On the top of the compression-spring, is placed a disk of insulating material $n''$, between it and the end of the carbon stick $o$. The length of the brush holders N and N' are somewhat longer than the axial length of the armature, and they are secured in perforations provided therefor in the insulation disks L, occupying a position parallel to the axis of the armature, between the lateral extensions $b'$ and $b''$, on either side of the body-portion $b$. The open ends of the brush-holders are turned in opposite directions, respectively, so that there is a spring-impelled carbon brush $o$ protruding from each end of the armature. To the insulation disk L, at one end of the armature, is secured one or two centrifugally-operated springs $m$ and $m'$, the free ends of which normally rest against the protruding ends of the brush-holders N and N', respectively. To each of the springs is adjustably secured a weight $r$, shown in detail in Fig. 10. $r'$ are stop-pins to limit the movement of the springs $m$ and $m'$.

To either end of the motor, are removably secured the inclosing plates G and G', the faces of the laterally-extending edges of which are turned off to fit the outside faces of the spider plates C and C', leaving, as is shown in Figs. 3 and 4, an annular lip $g$, which, when the plates G and G' are secured to the spider-plates by the screws $g'$ (see Figs. 4 and 5) fits in a shoulder $g''$ formed in the spider-plates, determining to a nicety the concentricity of the two plates relative to the spider-plates: i. e., the motor as a whole. In the central hub portion of the plates G and G', are formed journal-bearings $f$ and $f'$ for the armature shaft F. In the journal-bearings are formed the oil wells $g'''$. The shaft F extends from one end of the motor adapting a fan or pulley (not shown) to be attached thereto.

In the bearings, already described, provided therefor, in the inner ends of the polar extensions of the spider-plate C, is revolubly secured the disk commutator E, composed of the plate E, in one of the side faces of which is formed a circular groove E', and the several commutator segments $1^e$, $2^e$, $3^e$, &c., which are rigidly secured in the circular groove E,' being insulated from the supporting plate E and from each other. The plate, as a whole, is formed with a central perforation to accommodate the armature shaft, being placed concentrically thereto.

The segmental side of the commutator is shown in Fig. 6. As shown in Fig. 3, in section, and in plan in Fig. 2, there is secured to each segment 1ᵉ, 2ᵉ, &c., a laterally-projecting pin s, which extends a short distance through the plate E, and is insulated therefrom by the flanged headed bushings s'. To the pins s, are secured the wires by which the different segments 1ᵉ, 2ᵉ, &c., are cross-connected, as hereinafter explained, and the terminals of the field magnet windings. The plate E is preferably faced on its flat side with a disk E'' of insulating material, to more effectually insulate the several cross-connecting wires in contact therewith.

As shown in Figs. 2 and 3, there is rigidly secured to the plate E a radially-extending lever-arm H for rotating the same in its bearings. The extending end of this arm H engages in a slot in the head end of a clamping bolt H' which is provided with a thumb nut h. (See Fig. 15.) This adjusting and clamping bolt protrudes through the incasing plate G, a circumferentially-disposed slot H'', being formed therefor in the laterally-extending edge portion of the plate G, as shown in Figs. 3 and 5.

To the inside of the incasing plate G' is secured, concentrically with the armature axis, the annular insulation plate P, on which is supported, on the inside, the contact ring P' and contact spring P''. To the other side surface of the plate P, are secured the binding posts Q and Q', one of which is electrically connected with the ring P', and the other with the spring P'', as shown in Fig. 4. By this means, when the machine is assembled, circuit is established to the field-magnet windings of the motor, one of the carbon brushes being held in revoluble contact with the contact ring P', (see Fig. 4) and the contact spring P'' being held in contact with the pin C'''. (See Fig. 3.)

As illustrated in the several views, the motor, as a whole, is supported on a tripod base, which comprises the raised platform portion R, which is rigidly secured by screws to the spider-plates C and C', the standard S, and the radially extending feet, T. The several radially-extending feet T are so disposed circumferentially that one will be in line with, and extend in the opposite direction from the end of the shaft F to which the fan is attached, thus bringing the ends of the other two feet approximately flush with the fan side of the motor. See Fig. 5. The first foot acts to brace the motor against the direct push of the fan in revolving, and the other two, while not obstructing the room for the fan and its guard, tends to brace the motor laterally. These results could not be obtained by any but the herein-described tripod arrangement. In the under side of the extending ends of the feet T are formed recesses to receive the cushioning plugs T' of soft rubber or similar material. The ends of the split band D are included between the platform portion R of the base and the body of the motor.

Having described the constructional features of my motor, I will now explain the method of winding and connections. In a small motor of this character by which only a small power is expected to be developed, the armature is preferably not wound, for economic reasons in the manufacture of the same. As indicated in Figs. 1, 2, 12, 13, and 14, the winding of my motor through which the operative current is directed, to make the armature rotate, consists in exciting coils 1, 2, 3, 4, &c., placed on the polar extensions of the field-magnet. As indicated in Fig. 2, the inner terminals of alternate coils, as those of 2, 4, and 6, are connected, respectively, to consecutive segments of the commutator, as 6ᵉ, 5ᵉ, 4ᵉ, and these segments connected with the segments opposite them, as 3ᵉ, 2ᵉ, and 1ᵉ, respectively. At the other end of the machine, as indicated in Fig. 1, the outer terminals of the several coils oppositely situated are connected together, respectively; i. e., 1 to 4, 2 to 5, and 3 to 6. The inner terminals of the remaining three coils 1, 3, and 5, not otherwise connected, as described, to the commutator-plate E, are connected together and to the common terminal c''', which is in electrical connection (when the machine is assembled, as indicated in Figs. 3, 4, and 5), by means of the contact-spring P'', with the binding-post Q', to which one terminal of the exterior feed circuit can be attached. The binding-post Q, to which the other terminal of the feed-circuit can be attached, is, as already described, electrically connected with the contact-ring P', with which, in the operation of the machine, one of the carbon brushes o—that supported in the brush-holder N'—makes contact. The circuit is continued through the holder N' to the other end of the machine, where the two holders N' and N are normally in electrical connection with each other. From the holder N, the circuit is completed back to one of the several segments 1ᵉ, 2ᵉ, &c., of the commutator E, the particular one being dependent on the position of the armature B by which the brushes are carried. The terminals of the coil M, embedded in the face of the armature B, are connected, respectively, one to the spring m, and the other to the brush-holder N, with which the spring normally makes contact. The terminals of the coil M' are similarly connected with the spring m' and brush-holder N'. The springs m and m' are also electrically connected together. These connections are shown in the schematic view in Fig. 8. By this means,—the cross-connecting of the two springs m and m', the two brush-holders are virtually connected, electrically, together, when the springs m and m' are in contact with their respective brush holders N and N', as they are normally, the circuit being thereby made direct from one brush-holder to the other, irrespective of the coils M and M'. This normal condition is shown in Figs. 1 and 7.

The principles of operation are as follows: Circuit being established to the motor, from some external source, the energizing current enters at the binding-post Q with which the ring P' is connected. From the ring, the current is taken up by the brush o in the holder N'. From the brush-holder N', it is conducted to the holder N, and, from it, through its carbon-brush to some one of the segments of the commutator. From this segment, it traverses, first, the field-magnet helix which is connected therewith; then, the helix on the opposite polar extension of the field-magnet, and, then, through the common terminal and the contact-spring and its binding-post Q', out from the motor. The current thus energizes the oppositely-placed polar extensions, establishing a magnetic field, the magnet circuit of which, in one instance, is closed through the annular portion of the field-magnet, and, in the other, to a greater or less degree, by the armature. It is in the effort of the armature to assume a position for thus completing the magnet circuit, and in the effort to straighten, to the greatest possible degree, the magnetic lines of force existing between the energized polar extensions, that impetus of rotation is imparted to the armature. The position of the brush that makes contact with the commutator—in fact, of both brushes—relative to the diametrical position of the body-portion of the armature, is fixed. The field-magnet coils to which the current is directed, in the rotation of the armature, at any instant, is therefore dependent on the position of any one segment of the commutator-plate E with which the brush is in contact, relative to the polar extension the terminal of the winding of which is connected thereto. This is determined by the position of the handle or arm H, by which the commutator is rotated in its bearings. When the handle is thrown to the middle—the position shown in Fig. 2—the commutator disk will be brought to a position adapting the brush in the holder N to make contact with that segment of the commutator-plate which will direct the current to energize the polar extensions immediately between which the armature is situated. This condition is illustrated in Fig. 12. In this instance, there is no tendency in the armature to rotate. But, immediately the commutator-plate is rotated in either direction, (considering the armature, for the sake of illustration, to remain stationary while the change is being made) sufficiently to bring the next segment of the commutator into contact with the brush, the current will be directed, in a divided circuit, to the exciting coils of the next polar extensions in the opposite direction. This will at once establish a new magnetic field, in which the present position of the armature is not one of equilibrium. The armature would, therefore, tend to rotate to assume a position of maximum closing of the magnet circuit. Before, however, it has reached this secondary position in the newly established magnetic field, the brush has left the rearward segment and is only in contact with the segment that directs the current to the coils of the forward polar extensions.

In Fig. 13, the commutator is shown as revolved one-twelfth of a turn to the right, one in which the brush o, when still in its first position, is in contact with two segments, $1^e$ and $2^e$, energizing the coils on the polar extensions $3^a$ and $6^a$, at the same time as those on $1^a$ and $4^a$. The normal position of the armature B, when allowed to rotate, in this newly established field, corresponds to the line $x-x$, the brush having left the original position of contact with the two segments $2^e$ and $1^e$, resting only on the segment $1^e$, whereby the polar extensions $3^a$ and $6^a$ only are energized, this tending to impel the armature still farther around, until the first condition is re-established. Thus, it will be seen that, with the commutator in this one-twelfth revolved position, the condition of the armature being situated directly between energized polar extensions cannot be fulfilled, the armature being always approximately one-twelfth of a turn or forty degrees behind the position to do so. As shown in Fig. 14, the commutator can be still further revolved (to one-sixth of a turn or eighty degrees) from the original central position of the handle H—a position in which the commutator segment with which the brush o is in contact is still farther away from that in which it directs the current to the coils of the polar extensions between which the armature is situated, to close the magnetic circuit, and giving the armature a still greater impetus of rotation; i. e., increasing its speed. This description of the change of position of the commutator to the right, making the armature rotate to the left, applies as well when the change of position is made to the left, when the armature will rotate to the right.

From the foregoing discussion, it is evident that, as the commutator disk is revolved, from the neutral position, in either direction, the speed is increased, up to a certain point, and the magnetic circuit is completed to a proportionately less degree. It follows, therefore, for obvious reasons, that, when the commutator is set for slower speeds, the motor is taking less current. This very desirable result, in the economic running of the motor, has been proved by actual experiment.

The function of the coils M and M' is this: Being set in a plane parallel to the plane of revolution of the armature and to the plane of the magnetic lines of force between the energized field-magnet poles, there will be no current induced in the coils by the rotation of the armature. When the armature is rotated, the tendency of the centrifugal force will be to throw the free ends of the springs m and m' away from their contact with the brush-holder tubes N and N', respectively (see Fig. 8), forcing the energizing current through the coils M and M'. This not only throws in an artificial resistance in the motor circuit, but, the coils being almost altogether surrounded by iron, they will act as choking coils to choke back the current. In this manner, the motor is made automatically self-regulating when the load is varied, the weights $r$, acting in connection with coils M and M', in the capacity of a centrifugal governor. In small machines, such as a fan motor, where the load is practically constant, there is no need for this means of regulation. In this instance, the coils M and M' and springs $m$ and $m'$ can be dispensed with, and the brush-holders N and N' simply connected together, electrically.

The weights $r$ on the springs $m$ and $m'$ are preferably set to be thrown outwardly by different speeds of the armature. These same conditions could, of course, be established by appliances exterior to the machine; but the main feature of advantage in my arrangement is that the coils and cutting-in devices are all self-contained in the armature, and rotate therewith, obviating the necessity of any brushes or similar appliances to cut in the coils when the armature is rotated.

It has been found by actual experiment that the motor can be made very nicely self-regulating by dispensing with the choking coils M and M', making use of the springs $m$ and $m'$ only, in the manner described—that is, by opening the circuit to the motor, by the centrifrugal movement of the springs when the armature is rotated, instead of cutting it through the coils M and M'. It has been found that, due to the weight and consequent momentum of the armature, a momentary opening of the circuit occurs by the free ends of the springs $m$ and $m'$ leaving their contact with their respective brush-holder tubes. Of course the springs $m$ and $m'$ can be made as delicately sensitive to a variation in the speed of rotation of the armature, as may be desired. It has been found that even with suddenly varying loads the motor can be made to be very delicately self-regulating by this means alone.

The advantage in placing the brush-holders in the unoccupied space in the armature, as shown, is that it permits a length of carbon being used that could not be accommodated by any other arrangement of the parts of the motor. This arrangement accommodates a length of carbon that will adapt the machine to be continuously run for a comparatively long time without renewal of the carbons and without attention.

The object of the arrangement in the brush-holders—that of interposing the disk $n''$ of insulating material between the inner ends of the carbons $o$ and the compression springs $n'$—is this: that the continuity of the circuit from the brush-holder to the carbon, through the spring, is broken, thereby forcing the current to take up a circuit through the contact of the brush-holders with the carbon. It has been found, in practice, that, when part of the current is allowed to flow through the spring, more or less of the temper of the spring is destroyed by the heat developed in the same by the passage of the current therethrough. This is obviated by my arrangement.

The feature in the armature, of making the operative surface thereof eccentric to the axis of rotation, is fully described, and its operative advantages fully set forth in an application filed by myself on June 15, 1891, Serial No. 396,248, the object being to make the motor sensitively self-starting under all conditions. In the present form, as described, this eccentricity extends toward both the rearward and forward edges, in order that the resultant effect will be similarly operative when the armature is rotated in either direction, as provided for in the revoluble commutator.

In the aforementioned application, is also described a Z-shaped form of armature, provided with a forwardly projecting lip-portion, extending from the body-portion of the armature, of which the form described and illustrated herewith may be considered as a modified improvement.

In practice, it has been found that, when the motor is operated, there is, in some positions of the armature, a very strong back-pull of the armature toward a rearward polar extension, or extensions, from the windings of which the energizing current has been cut off by the revolving brushes. It is evident that, when the armature is rotating between energized field-magnet poles, the armature is polarized, and that there will be stray magnetic lines extending from the armature seeking a magnetic circuit through the nearest polar extensions and annular portion of the field-magnet. These, in the rotation of the armature, will be grouped, as the armature is leaving an energized polar extension, toward the rearward corner of the armature, tending to rotate the armature backward. This defect has been remedied, in the present form, which, while still embodying the salient features of advantage of the forwardly projecting lip—that of shunting into a newly established magnetic field and gently curving the magnetic lines of force through the body-portion of the armature not otherwise included—it presents these same conditions for a reversal of the motor, and, by presenting a rearwardly extending lip, or projection, does not concentrate the straying lines of induced magnetism as the comparatively abrupt corner, and, in that the lines, where they do exist, are offered a gently curved path, they do not have such a strong influence against the forward pull of the forwardly-extending lips. The circumferential extent of the operative face of the armature is practically the same as in the older form, leaving it in that respect as efficient.

I claim—

1. In an electric motor, the combination with the armature, of one or more coils wound on the armature in a plane parallel to the plane of the magnetic lines of force, and means for throwing the said coil or coils into the motor circuit: substantially as, and for the purposes described.

2. In an electric motor, the combination with the armature of one or more coils wound on the armature in a plane parallel to the plane of the magnetic lines of force, and means actuated by the rotation of the armature, for throwing the said coils into the motor circuit: substantially as, and for the purposes described.

3. In an electric motor, the combination with the armature of a choking coil or coils secured to and rotating with said armature and means for throwing said coils into the motor circuit: substantially as, and for the purposes described.

4. In an electric motor, the combination with the armature, of a coil wound on the said armature in a plane parallel to the lines of force and a spring for shunting said coil and adapted to be actuated by the rotation of the armature to cut said coil into the motor circuit: substantially as, and for the purposes described.

5. In an electric motor, the combination with the rotating part of the motor, of a coil secured to said rotating part in a plane parallel to the plane of the magnetic lines of force, and means actuated by the rotation of such rotating part to cut the said coil into the motor circuit: substantially as, and for the purposes described.

6. In an electric motor, the combination with the armature, of a coil wound on said armature in a plane parallel to the magnetic lines of force, a spring secured to the armature adapted to shunt the said coil and to be actuated by the rotation of the armature to cut said coil into the motor circuit: substantially as, and for the purposes described.

7. In an electric motor, the combination with an armature non-circular in cross-section, of plates secured on the ends of the armature, and a brush-holder, the ends of which are supported by the end plates, respectively, and the body of which occupies the cut-away portion of the armature, substantially as and for the purposes specified.

8. In an electric motor, the combination with the armature, of a stationary commutator situated at one end of the armature, a stationary contact-plate at the other end of the armature, and a circuit-establishing device secured to and rotating with the said armature adapted to make circuit between the commutator plate and the contact-plate: substantially as, and for the purposes described.

9. In an electric motor, the combination with the armature, of a normally stationary adjustable-commutator-plate situated at one end of said armature, a stationary contact-plate situated at the other end of the armature, and a circuit-establishing device secured to and rotating with the armature adapted to make circuit between the commutator-plate and the contact-plate: substantially as, and for the purposes described.

10. In an electric motor, the combination with the armature, of a commutator situated in proximity to one end of the armature, a contact-plate situated in proximity to the other end of the armature, a brush secured to and rotating with the armature, adapted to make contact with the commutator, and another brush secured to and rotating with the armature, adapted to make contact with the contact-plate, the said brushes being electrically connected together: substantially as, and for the purposes described.

11. In an electric motor, the combination with the armature, of a segmental disk commutator situated in proximity to one end of the armature in a plane to which the axis of the armature is perpendicular, a stationary annual contact-plate situated in proximity to the other end of the armature in a plane perpendicular to the axis of the armature, a brush carried by the armature adapted to make contact with the commutator, another brush adapted to make contact with the contact-plate, said brushes being electrically connected together: substantially as, and for the purposes described.

12. The combination with a carbon brush-holder, consisting in a cylindrical tube closed at one end and open at the other, of a carbon, non-circular in cross-section, the tube being crimped or otherwise formed at its open end, to conform with cross-section of the carbon, substantially as, and for the purposes specified.

13. The combination with a carbon brush-holder, consisting in a cylindrical tube, closed at one end and open at the other, of a carbon, non-circular in cross-section, and spring fitting the inside of the tube, the tube being crimped or otherwise formed, to conform with the cross-section of the carbon, substantially as and for the purpose specified.

14. In an electric motor, the combination with the armature and an insulation disk secured on either end of the same, of a brush-holder consisting in a tube, the ends of which are supported in said insulation disks and project therethrough: substantially as, and for the purposes described.

15. In an electric motor, the combination with the field-magnet and coils on the polar extensions of the same, of an armature, a stationary contact-plate, an adjustable commutator, and a circuit-establishing device, revolving with the armature adapted to make circuit between the contact-plate and the commutator-plate: substantially as, and for the purposes described.

16. In an electric motor, the combination with an adjustable normally stationary commutator, of an inclosing plate, a handle for the commutator, the plate being formed with a slot through which the commutator handle protrudes, substantially as and for the purposes specified.

17. In an electric motor, the combination with an adjustable, normally stationary commutator, of a handle rigidly secured to the commutator, a removable inclosing plate formed with a slot, a handle extension piece slidingly fitted in the slot and adapted to engage with the end of the commutator handle when the inclosing plate is secured in place, substantially as and for the purposes specified.

18. In an electric motor, the combination with an adjustable, normally stationary commutator, of a handle rigidly secured to the commutator, an inclosing case formed with a slot through which the handle protrudes, and means for locking the handle against movement, substantially as and for the purposes specified.

19. In an electric motor, the combination with a field magnet formed with an even number of polar extensions and a bi-polar armature, of an adjustable commutator, the opposite sections of which are electrically connected together, and helices on the polar extensions of the field-magnet, coils on opposite polar extensions being connected together in series, the remaining terminals of alternate coils being connected to a common terminal, and the remaining terminals of the remaining coils being connected, respectively, to consecutive sections of the commutator, and means, carried by the armature, for establishing circuit successively to the different segments of the commutator, substantially as and for the purposes specified.

20. In an electric motor, the combination with the field-magnet, of inclosing-plates removably secured to either end of the same, exterior terminal connections secured to one of said inclosing-plates, a contact-plate secured to the said inclosing-plate, electrically connected to one of said exterior terminal connections, and a contact-spring secured to the said inclosing-plate and electrically connected with the other exterior terminal connection: substantially as and for the purposes described.

In testimony whereof I affix my signature, in presence of two witnesses, this 23d day of July, 1892.

ALEXANDER W. MESTON.

Witnesses:
A. RAMEL,
HUGH K. WAGNER.